United States Patent [19]
Alt et al.

[11] Patent Number: 4,877,258
[45] Date of Patent: Oct. 31, 1989

[54] FOLD BELLOWS FOR ROTATING VEHICLE DRIVE JOINT

[75] Inventors: Claus-Christian Alt, Ebersbach; Rudolf Gobel, Stuttgart; Heinz Koch, Fellbach; Wolfgang Niechoj, Weinstadt; Theodor Grossmann, Bad Ditzenbach; Felix Deffner, Esslingen, all of Fed. Rep. of Germany

[73] Assignee: Dailer-Benz Aktiengesellschaft, Stuttgart, Fed. Rep. of Germany

[21] Appl. No.: 128,182

[22] Filed: Dec. 3, 1987

[30] Foreign Application Priority Data

Dec. 4, 1986 [DE] Fed. Rep. of Germany ....... 3641393

[51] Int. Cl.⁴ ........................... F16D 3/84; F16J 3/04; F16J 15/52
[52] U.S. Cl. .................. 277/212 FB; 464/175
[58] Field of Search ............... 277/212 FB; 464/175; 74/18.1, 18.2

[56] References Cited

U.S. PATENT DOCUMENTS

| | | | |
|---|---|---|---|
| 2,702,996 | 3/1955 | Davis | 464/175 X |
| 3,430,457 | 3/1969 | Gee | 464/175 X |
| 3,688,523 | 9/1972 | Schafer | 464/175 |
| 3,817,057 | 6/1974 | Orain | 464/175 X |
| 4,278,262 | 7/1981 | Mizutani et al. | 277/212 FB |
| 4,338,796 | 7/1982 | Orain . | |
| 4,360,209 | 11/1982 | Ukai et al. | 464/175 |
| 4,516,959 | 5/1985 | Krude | 464/175 |
| 4,556,399 | 12/1985 | Billet et al. | 277/212 FB X |
| 4,559,025 | 12/1985 | Dore | 277/212 FB |
| 4,693,484 | 9/1987 | Ukai et al. | 277/212 FB |

FOREIGN PATENT DOCUMENTS

| | | | |
|---|---|---|---|
| 2505542 | 8/1976 | Fed. Rep. of Germany | 277/212 FB |
| 3417709 | 11/1983 | Fed. Rep. of Germany . | |
| 3324997 | 1/1985 | Fed. Rep. of Germany . | |
| 2257042 | 8/1975 | France | 464/175 |
| 2580761 | 10/1986 | France . | |
| 2031530 | 4/1980 | United Kingdom | 277/212 FB |

*Primary Examiner*—Allan N. Shoap
*Attorney, Agent, or Firm*—Barnes & Thornburg

[57] ABSTRACT

A fold bellows for rotating drive joints is proposed which, although it is equipped with a plurality of folds along its length, admits large bend angles without the flanks of its folds having mutual contract for a physical bellows dimensioning which corresponds approximately to a dimensioning of known fold bellows. For this purpose the fold bellows is equipped with a joint side fold of larger diameter, with a shaft side fold of smaller diameter and with at least one further fold which is provided at an axial interval from the two other folds and is smaller than the shaft side fold in diameter.

8 Claims, 2 Drawing Sheets

FOLD BELLOWS FOR ROTATING VEHICLE DRIVE JOINT

BACKGROUND & SUMMARY OF THE INVENTION

The invention relates to a fold bellows made of resilient material for drive joints provided with lubricant and exhibiting large bend angles.

Fold bellows for drive joints, which are used for driving steered front wheels of motor vehicles, for example, are equipped, in order to permit large bend angles, with a plurality of folds which are directly mutually adjacent. Starting from the large receiving diameter of the fold bellows on the joint side, both the fold external diameter and also the radial interval of the fold bottom for the bellows axis decrease from fold to fold towards the shaft side (compare German published Unexamined Application -DE-OS 3,417,709).

However, in spite of this stepped fold construction, it is unavoidable that in the case of relatively large bend angles of rotating drive shafts, adjacent fold flanks touch each other or roll and mill against each other under pressure. Then, conditioned by a flank deformation somewhat in the manner of an S-bend, which occurs simultaneously, a relative displacement of mutually contacting flank surface parts occurs simultaneously in the peripheral direction.

The consequence of this is that due to these relative movements the fold flanks rub against each other during each shaft resolution, which results in a premature destruction of such fold bellows.

An object of the invention is to improve a fold bellows of the above mentioned type so that self-destructive influences of bellows folds during intense joint bending are avoided for bellows dimensions which correspond approximately to the physical dimensioning of the known fold bellows.

This object is achieved according to the invention by disposing a further bellows fold in a constricted bellows section disposed intermediate outer bellows folds at the respective joint and shaft sides.

In a fold bellows constructed according to the invention and with mutual association of the bellows folds, on the one hand a region of greater resilient yielding capacity is created between the joint side outer fold and the shaft side outer fold by the bellows fold exhibiting the smallest diameter, and on the other hand it is achieved in the region of the interstice present between these folds ween the fold bellows bends, that even for large bend angles between the joint side and shaft side folds, a greater radial clearance still remains in the region of the fold exhibiting the smallest diameter, so that the bellows folds which approach each other during bending remain without mutual contract. Simultaneously, there results from the bellows fold exhibiting the smallest diameter a bellows deformation which ensures that bellows inner wall parts and bellows inner circumferential edges do not touch the drive shaft, and cannot be damaged thereby, during bending of the fold bellows.

Other objects, advantages and novel features of the present invention will become apparent from the following detailed description of the invention when considered in conjunction with the accompanying drawings.

DETAILED DESCRIPTION OF THE DRAWINGS

Figure 1:
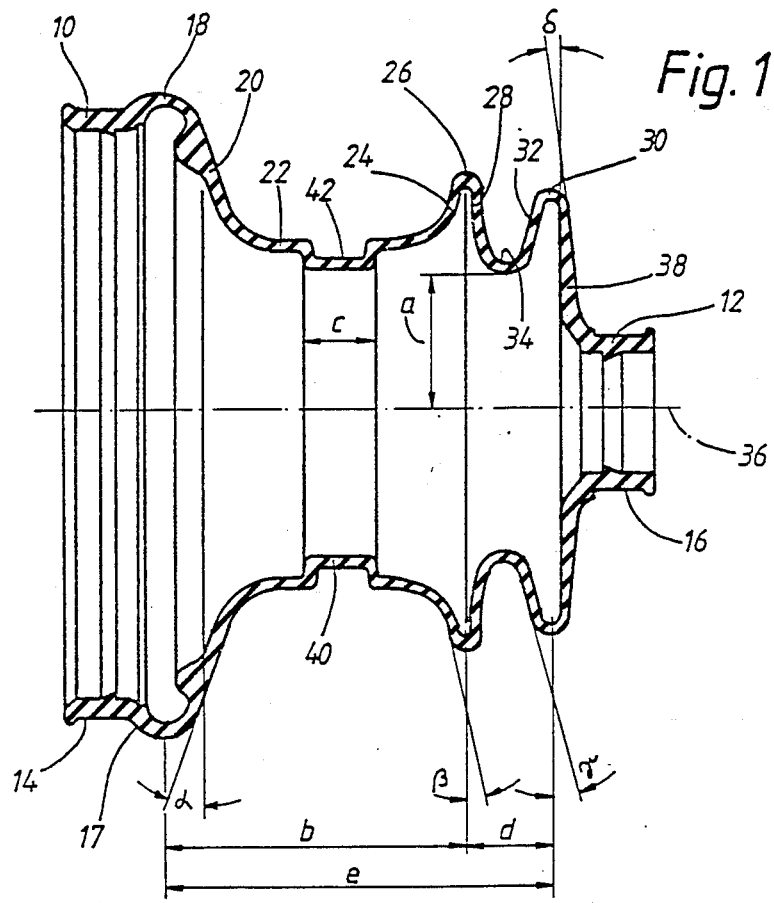
FIG. 1 shows a longitudinal section of a first exemplary embodiment of a fold bellows in the rest position, in which the bellows fold exhibiting the smallest diameter forms an inner fold.

The fold bellows according to FIG. 1 consists of elastomeric material, preferably rubber. It is provided with a collar 10 or 12 at each of its end faces. The collar 10 serves for fluidtight fastening to the outer circumference of a joint outer part of a drive joint, not shown for simplicity, a synchronising fixed joint for example, for the wheel side drive shaft of an axle shaft for the drive of steered front wheels of motor vehicles, particularly motor cars.

The collar fastening is achieved by means of a strip-shaped fastening clip which is insertable into a groove 14 on the collar outer circumference. The collar 12 serves for fluidtight fastening on the drive shaft mentioned, for which purpose it is likewise equipped with a collar circumferential groove 16 to receive a fastening clip.

The collar 10 is adjoined by a bellows fold 18 projecting radially slightly beyond its circumference, which merges by its fold flank 20 remote from the collar 10 into a cylindrical bellows shank 22, the external diameter of which is substantially smaller than that of the bellows fold 18. The bellows shank 22 merges into a fold flank 24 of a further shaft side bellows fold, the external diameter of which is greater than that of the bellows shank 22, but considerably smaller than the external diameter of the joint side bellows fold 18.

The collar 12 could be shaped directly on the shaft side fold flank 28 of the bellows fold 26. However, this bellows fold 26 is preferably adjoined by yet another bellows end fold 30, the external diameter of which could correspond to that of the bellows fold 26, but is preferably chosen slightly smaller in the present case. The fold bottom 34 formed by the two adjacent fold flanks 28, 32 of these bellows folds 26, 30 has internally a smaller radial interval "a" from the bellows axis 36 than the bellows shank 22.

The collar 12, which is shaped onto the shaft side fold flank 38 of the bellows end fold 30, is constructed substantially smaller in diameter than the collar 10. Consequently the fold flank 38 simultaneously forms a bellows end wall, whereas the fold flank 17 of the joint side bellows fold 18 which merges into the collar 10 has only a small radial extension.

The mutually facing fold flanks 20, 24 merge with relatively large radii into the bellows shank 22. Approximately in the centre of the crest interval "b" of the two bellows folds 18 and 26, a further fold, the bellows fold 40 of U-shaped cross section shaped radially inwards in this exemplary embodiment, is shaped onto the bellows shank 22, and its internal diameter is consequently smaller than the external diameter of the bellows fold 26 and has preferably a radial interval from the bellows axis 36 which corresponds approximately to that of the inner wall of the fold bottom 34.

The width "c" of the inner bellows fold 40 forming a peripheral groove 42 on the external circumference of the bellows shank 22 is coordinated with the length of the bellows shank 22 so that when the fold bellows bends the bellows shank 22 acquires in its central region a particular resilient and creasable construction, the significance of which is explained below.

As may be seen from FIG. 1, the fold bellows exhibits substantially a constant wall thickness over the region between its terminal bellows folds 18 and 30. On the other hand, the fold flanks 17 and 38 of the bellows folds 18, 30 thicken slightly towards the respective collar 10 or 12.

Due to the bellows end fold 30 following the bellows fold 26, it is achieved during the bending of the revolving fold bellows, that the fold flank 28 of the bellows fold 26 is substantially relieved by the alternate bend (S-bend fashion) imposed upon the drive shaft by the bend angle.

A fold bellows for sealing the joint inner space of a synchronising fixed joint filled with lubricant relative to the drive shaft connected to the said fixed joint exhibits for such a joint the following approximate dimensions for the purpose of achieving a residual interstice between the bellows folds 18 and 26 adjoining the inner bellows fold 40 for a maximum bend angle of approximately 37° of the synchronising fixed joint, provided the external diameter for fastening the collar 10 to the outer joint part is approximately 95 mm, the external diameter of the shaft section of the drive shaft which receives the collar 12 approximately 20 mm, and the wall thickness of the collars 10, 12 approximately 3 mm.

1. Crest interval "b" of the two bellows folds 18, 26 adjacent to the bellows fold 40 directed radially inwards is between 48 and 58 mm, 2. Width "c" of the bellows fold is between 10 and 15 mm preferably 12 mm, 3. External diameter of the joint side bellows fold 18 is between 100 and 120 mm, preferably 106 mm, 4. External diameter of the bellows fold 26 is between 71 and 89 mm, preferably 79 mm, 5. Internal diameter of the bellows fold 40 is between 40 and 50 mm, preferably 44 mm, 6. External diameter of the bellows fold 30 is between 70 and 80 mm, preferably 74 mm, 7. Radial interval of the fold bottom present between the bellows folds 26, 30 from the bellows axis 36 is between 20 and 25 mm, preferably 22.5 mm, 8. Internal diameter of the bellows shank 22, is between 50 and 60 mm, preferably 54 mm, 9. The follows angles between fold flanks and a plane perpendicular to the bellows axis 36:

Angle $\alpha$ of the fold flank 20, is between 20° and 25°, preferably 22°

Angle $\beta$ of the fold flank 24 $\leq$ 20°

Angle $\nu$ of the fold flank 32 $\leq$ 20°

Angle $\delta$ of the fold flank 38 $\leq$ 10°

10. Crest interval "d" of the two bellows folds 26, 30 is between 10 and 1.5 mm, preferably 12.5/mm 11. Crest interval "e" of the two bellows folds 18, 30 is between 60 and 70 mm, preferably 65 mm, 12. External transition radius of the fold flank 20 to the bellows shank 22 is between 5 and 15 mm, preferably 10.5 mm, 13. External transition radius of the fold flank 24 to the bellows shank 22 $\leq$ 10.

Figure 2:
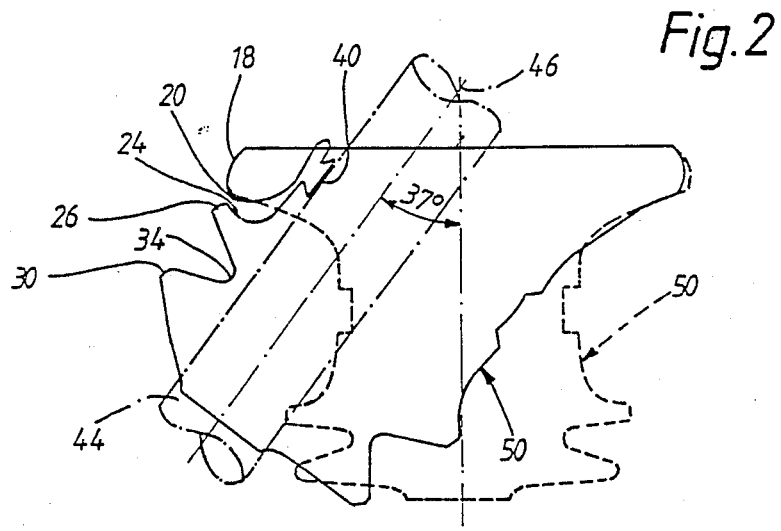
FIG. 2 shows a plotter diagram of the deformation of the fold bellows according to FIG. 1, in conjunction with a drive shaft bent through approximately 37°, on a different scale from FIG. 1.

A fold bellows exhibiting these dimensions according to FIG. 1 assumes the form shown in FIG. 2 for a maximum bend angle of approximately 37°. In FIG. 2 the drive shaft of the synchronising fixed joint is shown by chain-dotted lines and designated 44, and its articulation point 46. The fold bellows is generally designated 50, indicated by dash lines in its rest position (bend angle 0°) and illustrated by a solid line in its position of maximum bend.

It is clear that the flanks 20, 24 of the bellows folds 18, 26 remain without mutual contract in this case, and neither the inner bellows fold 40, which is deformed correspondingly, nor the fold bottom 34 come into contact with the drive shaft 44.

A variant construction of the fold bellows 50 discussed could consist in equipping the bellows shank 22 with two inner folds 40 located juxtaposed at a corresponding interval, according to other prefixed embodiments of the invention.

Figure 3:
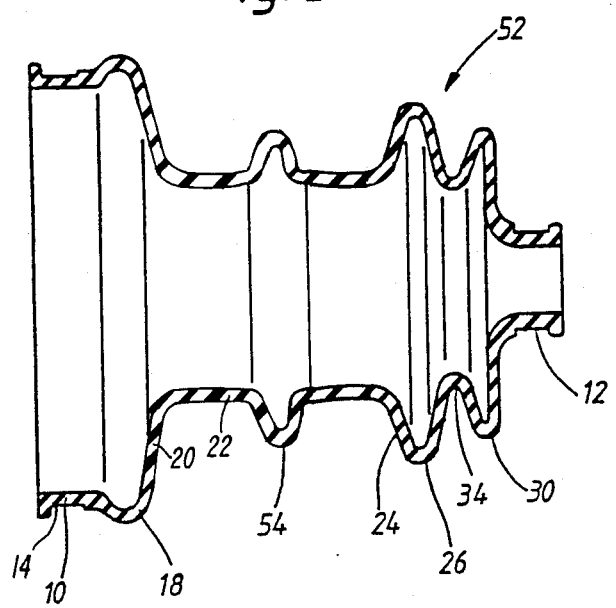
FIG. 3 shows a longitudinal section of a second exemplary embodiment of a fold bellows in the rest position, in which the bellows fold exhibiting the smallest diameter forms an outer fold.

FIG. 3 shows a second exemplary embodiment of a fold bellows 52, the structural difference from FIG. 1 consisting only in that a radially outward, instead of a radially inward, directed bellows fold 54 is provided on the bellows shank 22.

Figure 4:
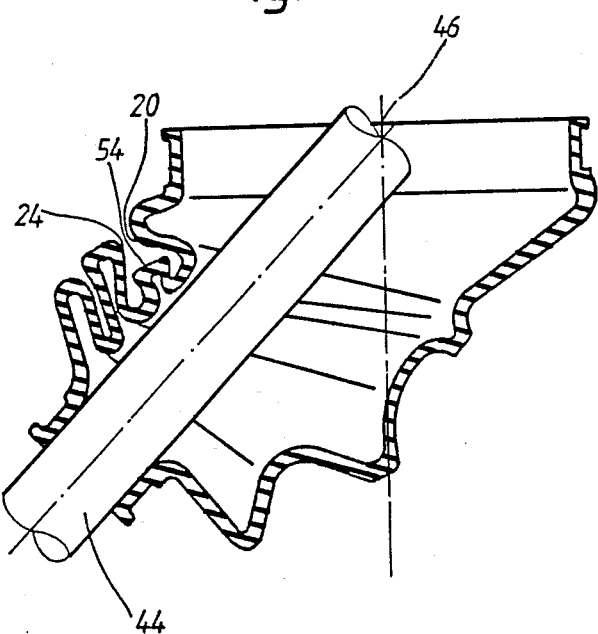
FIG. 4 shows an illustration of the deformation of a fold bellows according to FIG. 3, in conjunction with a drive shaft bent through approximately 45°.

The external diameter of this bellows fold 54 is chosen to be substantially smaller than, the external diameter of the bellows fold 26, so that again no contact can occur between the fold flank 20, 24 and between fold bellows and drive shaft 44 for a maximum bend angle of 45° for example (see FIG. 4).

In this case again a variant construction is conceivable according to the invention in the form that, instead of only one bellows fold 54, the bellows shank 22 is equipped with two bellows folds provided at a mutual lateral interval and having an external diameter corresponding approximately to the external diameter of the bellows fold 54.

Although the present invention has been described and illustrated in detail, it is to be clearly understood that the same is by way of illustration and example only, and is not to be taken by way of limitation The spirit and scope of the present invention are to be limited only by the terms of the appended claims.

What is claimed is:

1. Fold bellows made of resilient material for lubricated drive joints exhibiting large bend angles, which is adapted for fastening by collars provided on its end portions both to a drive shaft and also to an external circumference of a drive joint outer section and is provided with a configuration which avoids contact between folds, and contact between a fold and a drive means extending therethrough, while at the same time providing flexibility to the bellows to accommodate flexing of the drive means, and which exhibits adjacent one end portion and close to another end portion a respective fold, a constricted bellow section extending between said folds, said constricted bellows section being substantially cylindrical for an axial distance extending between said folds and which has ends which flare outwardly to meet said folds, wherein the fold adjacent the one end portion fastenable to the drive joint has the greatest diameter of all of the folds of the fold bellows, wherein at least one further fold is provided on the substantially cylindrical constricted bellows section spaced axially from the flared ends of said constricted bellows section, and wherein the diameter of said further fold is smaller than the diameter of that fold close to the end portion fastenable to the drive shaft.

2. Fold bellows according to claim 1, wherein the further fold is provided in the constructed bellows section approximately in a central region between said ends.

3. Fold bellows according to claim 2, wherein the wall thicknesses of the constricted bellows section and the further fold are substantially equal.

4. Fold bellows according to claim 1, wherein the further fold exhibits the smallest diameter of the fold bellows and has its surface convexly outwardly directed outwards.

5. Fold bellows according to claim 1, wherein the further fold exhibits the smallest diameter of the fold bellows and has its surface concavely inward directed.

6. Fold bellows according to claim 5, wherein the further fold is of U-shaped cross-section.

7. Fold bellows according to claim 1, wherein the fold close to the other end portion fastenable to the drive shaft is separated from the end portion fastenable to the drive shaft by a further end fold of approximately equal diameter.

8. Fold bellows according to claim 7, wherein the following are approximate relative proportions between dimensions of the bellows parts:
 (a). wherein the outermost surface of the bellows defines a crest and with the ratio of distance between extending crests of the folds to the width of the further fold is between 3.7 and 4.7:1,
 (b). the ratio of the external diameter of the fold adjacent the one said portion fastenable to the drive joint to the internal diameter of the further fold is between 2.1 and 2.9:1,
 (c). the ratio of the internal diameter of the further fold to the external diameter of the fold close to the other end portion fastenable to the drive is between 1:5 and 2.2,
 (d). the ratio of the external diameter of the fold adjacent to the one end portion fastenable to the drive joint to the length between the outermost extending crest of the fold close to the other end portion fastenable to the drive joint and the outermost extending crest of the further end fold is between 1.4 and 2.0:1, and
 (e). the ratio of the external diameter of the fold close to the other end portion fastenable to the drive shaft to the length between the outermost extending crest of the fold adjacent to the one end portion fastenable to the drive joint and the outermost extending crest of the further end fold is between 1:1 and 1.5.

* * * * *